United States Patent [19]

Pullukat

[11] 4,041,225
[45] Aug. 9, 1977

[54] POLYMERIZATION CATALYST AND METHOD

[75] Inventor: Thomas J. Pullukat, Hoffman Estates, Ill.

[73] Assignee: Chemplex Company, Rolling Meadows, Ill.

[21] Appl. No.: 645,284

[22] Filed: Dec. 29, 1975

[51] Int. Cl.² .......................... C08F 4/78; C08F 10/00
[52] U.S. Cl. ............................ 526/96; 252/430; 252/431 N; 526/106; 526/113; 526/123; 526/130; 526/154; 526/352
[58] Field of Search ............. 526/96, 106, 113, 123, 526/130, 154; 252/430, 431 N

[56] References Cited

U.S. PATENT DOCUMENTS

| 3,392,160 | 7/1968 | Orzechowski | 526/123 |
|---|---|---|---|
| 3,806,500 | 4/1974 | Karol | 526/130 |
| 3,813,381 | 5/1974 | Karol | 526/130 |
| 3,879,362 | 4/1975 | Chalfont et al. | 526/113 |
| 3,953,413 | 4/1976 | Hwang et al. | 526/96 |

*Primary Examiner*—Alan Holler
*Attorney, Agent, or Firm*—Wegner, Stellman, McCord, Wiles & Wood

[57] ABSTRACT

The method of making an active catalyst system, the catalyst system and a method of polymerizing olefins in which the catalyst system used is prepared by mixing an inorganic support such as silica with a chromium (III) amine complex and activating by heating the mixture to and at an elevated temperature in a non-oxidizing atmosphere.

33 Claims, No Drawings

POLYMERIZATION CATALYST AND METHOD

BACKGROUND OF THE INVENTION

It is well known that olefins can be polymerized and copolymerized with complex catalyst compositions consisting of two or more independent components. For example, the so-called Ziegler type catalysts use a transition metal compound and a reducing agent, normally a compound of a Group I, II or III metal (Mendeleef Periodic System). Such catalysts require special handling because of the sensitivity of the reducing agents to atmospheric gases and moisture. The transition metal component which is most often used commercially is titanium. It is also known that olefin polymers can be produced with certain catalysts supported on inert carriers; for example, the use of supported transition metal oxide catalysts on carriers such as alumina, silica and the like. The most well known of these is the chromium oxide on silica catalyst of U.S. Pat. No. 2,825,721 in which a hexavalent chromium compound is considered essential to form an active catalyst. Trivalent chromium is considered inactive in this type of catalyst (Catalysis Reviews, 3, 145–174 1969). Recent U.S. patents including U.S. Pat. Nos. 3,806,500; 3,836,595; 3,840,508 and others disclose new types of catalysts in which trivalent organochromium compounds deposited on inorganic oxide supports are used for olefin polymerizations. These organochromium compounds are oxygen and moisture sensitive and thus special handling is necessary.

SUMMARY OF THE INVENTON

It has now been discovered that certain trivalent chromium complex salts when ion exchanged onto silica or other inorganic oxides and then heat treated in an inert atmosphere produce a new type of important catalyst eminently useful for polymerizing olefins to polymers. These new ionic catalysts are very easily prepared and they can be subjected to water and air without degradation until activated. These new catalysts do not require cocatalysts such as alkyl aluminum or other metal alkyls for activity even though co-catalysts may be used with them, if desired.

DESCRIPTION OF THE PREFERRED EMBODIMENTS

The chromium complexes used are the type known as chromium (III) amine complexes. The preparation of these complexes is described in Inorganic Synthesis, Vo. III and X, published by McGraw-Hill Book Company, New York. They can be generally described by the following formulae:

[Cr(en)$_3$]X$_3$ and

[Cr(pn)$_3$]X$_3$ in which en is ethylenediamine, pn is propylenediamine and X is a negative group relative to chromium such as inorganic or organic anions of the nature of chloride, nitrate, acetate, etc.

These trivalent compounds are air stable and are known to be safe to handle unlike the commonly used hexavalent chromium oxides.

The chromium complex is ion exchanged onto an inorganic (e.g. metal) oxide support (e.g. silica) having hydroxyl groups on the surface thereof. The ion exchange may be by either of the following two methods.

1. The silica is calcined by heating at a temperature from 100°–1000° C. Drying or activation of the support can be accomplished by calcining at nearly any temperature up to about its sintering temperature for a period of time at least sufficient to remove the adsorbed water but avoiding that which will remove all of the chemically bound water. Desirably, an inert gas stream through the support during the drying aids in the displacement. Temperatures of from about 100°–900° C. for a short period of about 2 hours or so should be sufficient if a well dried inert gas is used and the temperature not be permitted to get so high as to remove the chemically bound hydroxyl groups from the surface of the support.

The calcined silica is treated with a solution of sodium hydroxide to replace the acidic protons on silica with sodium cations. The sodium ion exchanged silica is further treated with an excess of chromium salt solution, and the sodium ion is exchanged with chromium ions. The chromium ion exchanged silica is washed repeatedly with water to remove all the extraneous ions.

Any grade of support can be used herein but the microspheroidal intermediate density (MSID) silica is preferred for highest activity. This grade has a surface area of 258 square meters per gram and a pore diameter of about 288 A., although the intermediate density (ID) silica having the same area but a pore diameter of 164 A., is as satisfactory. Other grades such as the G-968 and G-966 silica-alumina, as designated by the W. R. Grace & Co., having surface areas of 700 and 500 square meters per gram, respectively, and pore diameters of 50–70 A. are also quite satisfactory. Variations in melt index control and in polymer productivity can be expected between different grades of supports.

2. In the second method silica is calcined as above by heating at a temperature between 100°–1000° C. The calcined silica is treated directly with an ammoniacal solution of the chromium complex. The reaction may be written as follows:

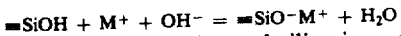

The chromium ion exchanged silica is washed repeatedly with water to remove all the extraneous ions. This method is simpler.

The silica which has been ion exchanged with the chromium complex may have the following structure:

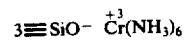

The chromium ion exchanged silica is heat treated in a stream of nitrogen or argon in a fluidized bed at temperatures between 100°–1000° C. Heating in a fluidized bed is much to be preferred for maximum activity of the catalyst. Fluidized bed type heating is believed to liberate some or all of the NH$_3$ molecules and create coordination vacancy on the chromium atoms. The preferred fluidizing helps better mixing, good heat transfer and rapid removal of the liberated NH$_3$ molecules. The chromium ion exchanged silica after activation is ready for use as a catalyst for olefin polymerization. This catalyst having coordinatively unsaturated chromium ions readily coordinates with ethylene causing ethylene polymerization. The chromium level in the final catalyst can be from 0.1–10% and 0.5–2% is preferred for economic reasons.

The catalyst may be used in ethylene polymerization, for example, in the presence of a solvent such as isobutane. The polymerization reaction is carried out at temperatures of from about 30° C. or less up to about 200° C. or more, depending to a great extent on the operating pressure, the pressure of the entire monomer charge, the particular catalyst being used and its concentration. The selected operating temperature is also dependent upon the desired polymer melt index since temperature is also a factor in adjusting the molecular weight of the polymer. Preferably, the temperature is from about 30°–100° C. in the conventional slurry or "particle forming" technique and from 100°–200° C. in "solution forming" operations. The control of temperature in this process is desirable as hereinafter more fully described in providing various effects upon the mulecular weight of the polymer as well as in controlling the phase in which they are made. As with most catalyst systems, high polymerization temperatures produce lower weight average molecular weight polymers, and consequently polymers of higher melt index.

The pressure can be any pressure sufficient to initiate the polymerization of the monomer charge and can be from subatmospheric pressure. using an inert gas as a diluent, to superatmospheric pressure, but the preferred pressure is from atmospheric up to about 1000 psig. As a general rule, a pressure of 20–800 psig is more preferred.

When an inert organic solvent medium is employed in the process of this invention it is not narrowly critical but should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isopentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene and the like, and chlorinated hydrocarbons, such as chlorobenzene, tetrachloroethylene, orthodichlorobenzene, and the like. Particularly preferred solvent media are cyclohexane, pentane, isopentane, isobutane, hexane and heptane.

The olefins that may be polymerized with the catalyst system of this invention preferably have from 2 to 8 carbon atoms and are 1-olefins and include ethylene, propylene, 1-butene, 1-pentene, 1-hexene, 4-methyl-1-pentene, 1-octene, butadiene, isoprene, piperylene, 1,3-octadiene, etc. Copolymers of two or more monomers can be so prepared according to this invention.

When the polymerization is conducted to a high solids level as hereinbefore set forth, it is of course desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the catalyst is suspended in a finely divided form.

This slurry is of course dependent upon the particular solvent employed in the polymerization and its solution temperature for the polymer prepared. Consequently, in this "particle form" embodiment, it is most desirable to operate at a temperature which is lower than the normal solution temperature of the polymer in the selected solvent. For example, polyethylene prepared herein may have a solution temperature in cyclohexane of about 90° C. whereas in pentane its solution temperature may be about 110° C. It is characterisric of this "particle form" polymerization system that a high polymer solids content is possible even at low temperatures, if sufficient agitation is provided so that adequate mixing of the monomer with the polymerizing mass can be accomplished. It appears that while the polymerization rate may be slightly slower at the lower temperatures, the monomer is more soluble in the solvent medium, thus counteracting any tendency to low polymerization rates and/or low yields of polymer.

It is also characteristic of the slurry process that the monomer appears to have substantial solubility characteristics even in the solids portion of the slurry so that as long as adequate agitation is provided, and the polymerization temperature is maintained, a broad range of size of solid particles in the slurry can be provided. Experience has shown that the slurry technique can produce a system having more than a 50% solids content, provided conditions of sufficient agitation are maintained. It is particularly preferable to operate the slurry process in the range of 30–40 weight percent of polymer solids.

Recovery of the polymer from the solvent medium is, in this embodiment, reduced to a simple filtration and/or drying operation and no efforts need to be expended in polymer clean-up and catalyst separation or purification. The residual concentration of catalyst in the polymer is so small that it can be left in the polymer.

Operating at temperatures higher than the solution temperature of the polymer in the selected solvent medium also can produce a high polymer solids content in a solution polymerization procedure. The temperature in this type of polymerization system must be sufficiently high to enable the solvent being used to dissolve at least 25–30% by weight of the polymer being produced. On the other hand, the temperature must be sufficiently low to avoid thermal destruction of the formed polymer and the particular catalyst employed. In general, for the various solvents and catalyst used, temperatures within the range of about 100° to about 170° C. have been found to be generally optimum for the practice of such solution polymerization procedure. However, the particular polymer being produced also has a significant effect on the optimum polymerization temperature. For example, ethylene-propylene copolymers which may be produced by this process may be soluble in many of these organic solvents at relatively low temperatures even though such temperatures may not be useful for the optimum production of ethylene homopolymers.

In the present process, the proportion of solvent to polymer by weight can range from 0.1:100 or even less, thereby maintaining a very high catalyst productivity and efficiency of the system.

When the solvent serves as a principal reaction medium, it is of course desirable to maintain the solvent medium substantially anhydrous and free of any possible catalyst poisons such as moisture and oxygen, by redistilling or otherwise purifying the solvent before use. Treatment with an absorbent material such as high surface area silicas, aluminas, molecular sieves and the like materials are beneficial in removing trace amounts of contaminants that may reduce the polymerization rate of poison the catalyst during the polymerization reaction.

The polymerization reaction can also be conducted in a fluidized bed of the type discussed above without requiring a solvent.

The following examples illustrate the present invention and are not intended as a limitation upon the scope thereof.

EXAMPLE 1

Hexammine chromium III nitrate was prepared as described in Inorganic Synthesis, Vol. III. Davison Chemical grade 952 silica (8 grams) was heated in a flow of air at 530° C. to drive off substantially all adsorbed water. The silica was then treated with sodium hydroxide solution until it was at a pH of 10.5, filtered and washed with water to remove excess sodium hydroxide. The resulting silica containing sodium ions was then treated with a solution of 0.6 g $(NH_3)_6Cr(NO_3)_3$ in 150 ml of water for 20 minutes. The silica that now contains chromic hexammine ions was separated by filtration, washed free of extraneous ions such as nitrate ions and liberated sodium ions and excess hexammine chromium III nitrate and dried. A portion of this material was activated by heating in a fluidized bed at 520° C. with 300 cc/min nitrogen flow. The resulting final catalyst which was green in color was used in ethylene polymerization in the following process.

A stainless steel reactor of 1300 ml capacity was heated to 105° C. under a nitrogen purge and about 0.3379 gram of catalyst was charged into the reactor and isobutane (500 ml) was added. Ethylene was then introduced to a pressure of 550 psig and the reactivity of the catalyst was found to be 367 g/g cat/hr. The catalyst was analyzed for chromium and was found to contain 0.46 wt. % chromium.

EXAMPLE 2

In this example a silica with chromium hexammine was prepared as in Example 1 and was activated in a fluidized bed by heating at 810° C. This catalyst was found to have an ethylene polymerization reactivity of 1360 g/g cat/hr. and the polymer produced had a melt index of 0.10.

EXAMPLE 3

Silica containing hexammine chromium was made by the sodium procedure of Example 1. This was heated in a fluidized bed under nitrogen at 810° C., cooled to 410° C. and treated with carbon monoxide for 30 minutes and finally cooled down under pure nitrogen. This catalyst was used in ethylene polymerization and had a reactivity of 715 g/g cat/hr.

EXAMPLE 4

25 grams of Davison Chemical 952 silica was heated in a stream of air at 510° C. until substantially all adsorbed water had been removed. The dry silica was added to a solution of 1.6 grams hexammine chromium nitrate in 100 cc of water and stirred and ammonium hydroxide was added to bring the pH of the solution to approximately 11. The slurry was stirred 17 hours, filtered ans washed with deionized water until no nitrate was detected in the washings. The resulting silica containing the hexammine chromic ion was air dried and the dry material activated by heating in a flow of argon at 790° C. This activated catalyst was used in ethylene polymerizaton and had a reactivity of 1990 g/g cat/hr.

In the following examples the same general procedure of Example 4 was followed:

| Exam. No. | Catalyst | Method of Cr Deposition | $C_2$ = Polym Reactivity g/g cat/hr |
|---|---|---|---|
| 5 | Precalcined silica (550° C) + $Cr(en)_3Cl_3$ 800° C, argon | Ion exchange | 1200 |
| 6 | Precalcined silica (550° C) + $Cr(en)_3Cl_3$ 800° C, argon | Ion exchange | 1206 |
| 7 | Precalcined silica (550° C) + $Cr(NH_3)_6Cl_3$ 800° C, argon | Ion exchange | 1705 |
| 8 | Precalcined silica (550° C) + $Cr(NH_3)_6Cl_3$ 700° C, argon | Ion exchange | 2118 |
| 9 | Precalcined silica (550° C) + $Cr(NH_3)_6Cl_3$ 700° C, argon | Ion exchange | 1988 |

Having described my inventon as related to the embodiments set out herein, it is my intention that the invention be not limited by any of the details of description, unless otherwise specified, but rather be construed broadly within its spirit and scope as set out in the appended claims.

I claim:

1. The method of making an active catalyst consisting essentially of: ion exchanging (1) a chromium (III) amine complex onto (2) a support which is a finely divided, difficultly reducible, inorganic support of the class consisting of silica, alumina, thoria, zirconia, titania, magnesia and mixtures thereof substantially free of adsorbed water and having cations on the surface thereof; and (3) activating the resulting ion exchanged material by heating to and at an elevated temperature in a non-oxidizing atmosphere.

2. The method of claim 1 wherein said complex is used in an amount to provide about 0.1–10 wt. % of chromium in said catalyst.

3. The method of claim 2 wherein said complex is used in an amount to provide about 0.5–2.0 wt. % of chromium in said catalyst.

4. The method of claim 1 wherein (1) is a member of the class consisting of $[Cr(NH_3)_6]X_3$, $[Cr(en)_3]X_3$ and $[Cr(pn)_3]X_3$ in which en is ethylenediamine, pn is propylenediamine and X is a negative group relative to chromium.

5. The method of claim 4 wherein (1) is $[Cr(NH_3)_6]X_3$.

6. The method of claim 4 wherein (1) is $[Cr(en)_3]X_3$.

7. The method of claim 4 wherein (1) is $[Cr(pn)_3]X_3$.

8. The method of claim 1 wherein the temperature of (3) is about 100°–1000° C.

9. The method of claim 1 wherein said heating of (3) is in a fluidized bed in a non-oxidizing atmosphere.

10. The method of claim 1 wherein (2) is treated with an aqueous solution of sodium hydroxide to replace the acidic protons of said support with sodium cations and the resulting sodium ion exchange support is further treated with an excess of an aqeuous solution of said (1).

11. The method of claim 1 wherein said support (2) is treated with an aqueous ammoniacal solution of (1) prior to the activating of (3).

12. An active catalyst prepared by the method consisting essentially of: ion exchanging (1) a chromium (III) amine complex onto (2) a support which is a finely divided, difficultly reducible, inorganic support of the class consisting of silica, alumina, thoria, zirconia, titania, magnesia and mixtures thereof substantially free of adsorbed water and having cations on the surface thereof; and (3) activating the resulting ion exchanged material by heating to and at an elevated temperature in a non-oxidizing atmosphere.

13. The catalyst of claim 12 wherein said complex is used in an amount to provide about 0.1-10 wt. % of chromium in said catalyst.

14. The catalyst of claim 13 wherein said complex is used in an amount to provide about 0.5-2.0 wt. % of chromium in said catalyst.

15. The catalyst of claim 12 wherein (1) is a member of the class consisting of $[Cr(NH_3)_6]X_3$, $[Cr(en)_3]X_3$ and $[Cr(pn)_3]X_3$ in which en is ethylenediamine, pn is propylenediamine and X is a negative group relative to chromium.

16. The catalyst of claim 15 wherein (1) is $[Cr(NH_3)_6]X_3$.

17. The catalyst of claim 15 wherein (1) is $[Cr(en)_3]X_3$.

18. The catalyst of claim 15 wherein (1) is $[Cr(pn)_3]X_3$.

19. The catalyst of claim 12 wherein the temperature of (3) is about 100°-1000° C.

20. The catalyst of claim 12 wherein said heating of (3) is in a fluidized bed in a non-oxidizing atmosphere.

21. The catalyst of claim 12 wherein (2) is treated with an aqueous solution of sodium hydroxide to replace the acidic protons of said support with sodium cations and the resulting sodium ion exchange support is further treated with an excess of an aqueous solution of said (2).

22. The catalyst of claim 12 wherein (2) is treated with an aqueous ammoniacal solution of (1) prior to the activating of (3).

23. The method of making polymers of 1-olefins of 2-8 carbon atoms and copolymers of said olefins and 1-olefins of 2-20 carbon atoms which comprises polymerizing said olefins under polymerizing conditions with the catalysts of claim 12.

24. The method of making polymers of 1-olefins of 2-8 carbon atoms and copolymers of said olefins and 1-olefins of 2-20 carbon atoms which comprises polymerizing said olefins under polymerizing conditions with the catalyst of claim 13.

25. The method of making polymers of 1-olefins of 2-8 carbon atoms and copolymers of said olefins and 1-olefins of 2-20 carbon atoms which comprises polymerizing said olefins under polymerizing conditions with the catalyst of claim 14.

26. The method of making polymers of 1-olefins of 2-8 carbon atoms and copolymers of said olefins and 1-olefins of 2-20 carbon atoms which comprises polymerizing said olefins under polymerizing conditions with the catalyst of claim 15.

27. The method of making polymers of 1-olefins of 2-8 carbon atoms and copolymers of said olefins and 1-olefins of 2-20 carbon atoms which comprises polymerizing said olefins under polymerizing conditions with the catalyst of claim 16.

28. The method of making polymers of 1-olefins of 2-8 carbon atoms and copolymers of said olefins and 1-olefins of 2-20 carbon atoms which comprises polymerizing said olefins under polymerizing conditions with the catalyst of claim 17.

29. The method of making polymers of 1-olefins of 2-8 carbon atoms and copolymers of said olefins and 1-olefins of 2-20 carbon atoms which comprises polymerizing said olefins under polymerizing conditions with the catalyst of claim 18.

30. The method of making polymers of 1-olefins of 2-8 carbon atoms and copolymers of said olefins and 1-olefins of 2-20 carbon atoms which comprises polymerizing said olefins under polymerizing conditions with the catalyst of claim 19.

31. The method of making polymers of 1-olefins of 2-8 carbon atoms and copolymers of said olefins and 1-olefins of 2-20 carbon atoms which comprises polymerizing said olefins under polymerizing conditions with the catalyst of claim 20.

32. The method of making polymers of 1-olefins of 2-8 carbon atoms and copolymers of said olefins and 1-olefins of 2-20 carbon atoms which comprises polymerizing said olefins under polymerizing conditions with the catalyst of claim 21.

33. The method of making polymers of 1-olefins of 2-8 carbon atoms and copolymers of said olefins and 1-olefins of 2-20 carbon atoms which comprises polymerizing said olefins under polymerizing conditions with the catalyst of claim 22.

* * * * *